United States Patent [19]

Trepka et al.

[11] Patent Number: 5,130,377
[45] Date of Patent: Jul. 14, 1992

[54] TAPERED BLOCK STYRENE/BUTADIENE COPOLYMERS

[75] Inventors: William J. Trepka; George A. Moczygemba; Ralph C. Farrar, Jr., all of Bartlesville, Okla.

[73] Assignee: Phillips Petroleum Company, Bartlesville, Okla.

[21] Appl. No.: 651,158

[22] Filed: Feb. 6, 1991

Related U.S. Application Data

[63] Continuation-in-part of Ser. No. 459,493, Jan. 2, 1990, abandoned.

[51] Int. Cl.$^5$ ............................................. C08F 297/04
[52] U.S. Cl. ........................................ 525/314; 525/250; 525/271; 525/256; 525/258
[58] Field of Search ................................ 525/250, 314

[56] References Cited

U.S. PATENT DOCUMENTS 4,584,346 4/1986 Kitchen .............................. 525/314
4,704,434 11/1987 Kitchen .............................. 525/250

FOREIGN PATENT DOCUMENTS 0746555 11/1966 Canada ................................ 525/314

Primary Examiner—James J. Seidleck
Assistant Examiner—Vasu S. Jagannathan
Attorney, Agent, or Firm—Morrison Bennett

[57] ABSTRACT

A method for preparing tapered block copolymers in a polymerization process by charging an initiator and monomers sequentially with one or more charges of first one of the monomers, then with a mixture of the two monomers, and then with one or more charges of the second monomer alternating with one or more charges of the first monomer with subsequent coupling, to produce a polymodal tapered block copolymer. Suitable monomers include conjugated dienes and monovinylaromatic compounds. The copolymers are suitable for use in injection and blow molding equipment; the copolymers are particularly useful for shrink films, containers, tubes, fibers and other packaging applications.

22 Claims, No Drawings

TAPERED BLOCK STYRENE/BUTADIENE COPOLYMERS

BACKGROUND OF THE INVENTION

This application is a continuation-in-part of application Ser. No. 07/459,493, filed Jan. 2, 1990, abandoned.

This invention relates to tapered block copolymers of conjugated dienes and monovinylarenes.

In another aspect, this invention relates to a method of preparing tapered block copolymers of conjugated dienes and monovinylarenes.

Polymerization of styrene and butadiene with organolithium initiators to produce block copolymers in which one or more non-elastomeric polymer blocks are bonded to one or more elastomeric polymer blocks has been disclosed. Similarly, styrene and butadiene with terminal tapered blocks have been prepared by sequential charging of initiator and monomers to the polymerization zone to produce block copolymers suitable for manufacture of transparent colorless blister packages.

There is a continuing need for transparent colorless material suitable for shrink wrap packaging applications. Having better shrinkage properties exhibited at lower temperatures would facilitate the use of block copolymer shrink wrap in packaging applications.

There has also developed in the polymer field, and especially in the packaging and related industries, a need for thermoplastic polymers that can be formed into transparent articles having high impact strength with good environmental stress crack resistance. These should be suitable for use with conventional injection and blow molding equipment and also suitable for use in other methods of forming plastics into containers, tubes, films, fibers and the like. Polystyrene, high impact polystyrene, branched block copolymers, and the like have been developed to meet these criteria with various degrees of satisfaction. There is a continuing need for colorless transparent materials with high impact strength and good environmental stress crack resistance.

SUMMARY OF THE INVENTION

Thus, it is an object of this invention to provide a novel tapered block copolymer of conjugated dienes and vinyl-substituted aromatic hydrocarbons with improved shrink properties.

A further object of this invention is to provide a novel process for making tapered block copolymers.

The inventive copolymers are prepared by:

(1) charging a monovinylaromatic monomer and an initiator and in the presence of a randomizer and allowing polymerization to occur until essentially no free monomer is present; thereafter (2a) charging additional monovinylaromatic monomer and initiator, and allowing polymerization to occur until essentially no free monomer is present;

(2b) charging a mixture of monovinylaromatic monomer and conjugated diene monomer, and allowing polymerization to occur until essentially no free monomer is present;

(2c) charging additional monovinylaromatic monomer and additional initiator, and allowing polymerization to occur until essentially no free monomer is present; thereafter (3) charging conjugated diene monomer and allowing polymerization to occur until essentially no free monomer is present; and finally (4) charging the reaction mixture with a coupling agent.

Charges (2a), (2b) and (2c) can be made in any order. Also, optionally, a charge of conjugated diene can be made next preceeding or next succeeding either of charges (2a) or (2b).

DETAILED DESCRIPTION OF THE INVENTION

The tapered block character of the polymer is produced by, after the initial charge or charges of monovinylaromatic monomer and initiator, charging with a mixture of monovinylaromatic monomer and conjugated diene. This is generally followed by a charge of monovinylaromatic monomer and initiator to give a low molecular weight component. Alternatively (as in Run 5 described hereafter in Table III) the last monovinylaromatic monomer charge and the mixture charge can be reversed with the monovinylaromatic charge preceeded by a conjugated diene charge. Finally, a charge of conjugated diene is introduced. In another embodiment of this invention the charges can be made in the sequence shown in the typical charging sequence shown in Table I. At each stage of charging, polymerization is allowed to continue until essentially no free monomer is present.

With each subsequent charge which includes initiator a different molecular weight species will be produced as well as the opportunity for polymerization of part of the charge with each of the existing species. After virtually complete polymerization of the final monomer charge, the active living linear block copolymers are charged with a polyfunctional coupling agent to allow coupling of each of the living species with each of the other species or with others of the same species to form the desired polymodal tapered block polymers.

A typical charging sequence, and the resulting polymers at each stage, is shown in the following table.

TABLE I

| Typical Charging Sequence | |
|---|---|
| 1. initiator$_1$ tetrahydrofuran and styrene$_1$ | S$_1$—Li$_1$ |
| 2. initiator$_2$ and styrene$_2$ | S$_1$—S$_2$—Li$_1$<br>S$_2$—Li$_2$ |
| 3. butadiene$_1$ and styrene, | S$_1$—S$_2$—B$_1$/S$_3$—Li$_1$<br>S$_2$—B$_1$/S$_3$—Li$_2$ |
| 4. butadiene$_2$ (optional) | S$_1$—S$_2$—B$_1$/S$_3$—B$_2$—Li$_1$<br>S$_2$—B$_1$/S$_3$—B$_2$—Li$_2$ |
| 5. initiator$_3$ and styrene$_4$ | S$_1$—S$_2$—B$_1$/S$_3$—B$_2$—S$_4$—Li$_1$<br>S$_2$—B$_1$/S$_3$—B$_2$—S$_4$—Li$_2$<br>S$_4$—Li$_3$ |
| 6. butadiene, | S$_1$—S$_2$—B$_1$/S$_3$—B$_2$—S$_4$—B$_3$—Li$_1$<br>S$_2$—B$_1$/S$_3$—B$_2$—S$_4$—B$_3$—Li$_2$<br>S$_4$—B$_3$—Li$_3$ |
| 7. Epoxidized Vegetable Oil | polymodal tapered block polymers with styrene terminal blocks | where S = styrene
B = butadiene
B/S = tapered block

At each stage, polymerization is allowed to continue until essentially no free monomer is present. The third, fourth, sixth and seventh steps shown above in the table of a typical charging sequence are carried out in the absence of additional initiator. Similarly, in invention charging sequences such as those shown in Table III and in the examples, steps in which only conjugated diene or in which a blend of conjugated diene and monovinylaromatic monomer is charged, no additional initiator is charged.

Tapered blocks in each of the growing polymer chains present are produced by simultaneously charging with both monomers as in the third step shown above in the table of a typical charging sequence. As can be seen from the intermediate products listed in the typical charging sequence table above, there are at least three distinct polymer chains before coupling. Thus, polymodal block copolymers comprising high, medium and low molecular weight species are produced. The randomizer causes random polymerization of the monovinylaromatic monomer and the conjugated diene, but the diene still enters into the chain faster than the monovinyl substituted aromatic so that the block tapers gradually from an essentially pure polydiene block, to a random copolymer block, to an essentially monovinyl substituted aromatic block.

The process of this invention can be carried out with any of the organomonoalkali metal compounds of the formula RM wherein R is an alkyl, cycloalkyl or arylcarbanion containing 4 to 8 carbon atoms and M is an alkyl metal cation. The presently preferred initiator is n-butyllithium.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Presently preferred is 1,3-butadiene.

The monovinylaromatic monomers which can be used contain 8 to 12 carbon atoms and include styrene, alpha-methylstyrene, p-vinyltoluene, m-vinyltoluene, o-vinyltoluene, 4-ethylstyrene, 3-ethylstyrene, 2-ethylstyrene, 4-tertbutylstyrene and 2,4-dimethylstyrene and mixtures thereof. Presently preferred is styrene.

The polymerization process is carried out in a hydrocarbon diluent at any suitable temperature in a range of −10° to 150° C., preferably in the range of 0° to 110° C., at pressures sufficient to maintain the reaction mixture substantially in the liquid phase. Preferred hydrocarbon diluents include linear and cycloparaffins such as pentane, hexane, octane, cyclohexane, cyclopentane and mixtures thereof. Presently preferred is cyclohexane. Generally the temperature is such that the resulting polymer is in solution.

Small amounts of polar compounds are used in the hydrocarbon diluent to improve the effectiveness of alkylmonoalkali metal initiators such as n-butyllithium and to effect partial randomization of the vinylarene/conjugated diene so as to increase the random portion of the tapered block. Examples of polar compounds which can be advantageously employed are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, tetramethylene oxide (tetrahydrofuran), dimethyl sulfide, diethyl sulfide, tetramethylethylenediamine, tetraethyldiamine, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, 1,2-dimethoxybenzene, N,N-di-methylaniline, N-methyl-N-ethylaniline, N-methylmorpholine, and the like. It is to be understood also that mixtures of these polar compounds can be employed in the practice of the present invention. The amount of polar compounds used in admixture with the hydrocarbon diluent is usually in the range of 0.005 to 50 weight percent of the total mixture. Presently preferred are either tetrahydrofuran or diethyl ether. Amounts of tetrahydrofuran to provide preferably from about 0.01 to 10 phm (parts per 100 parts of total monomer), and more preferably 0.02 to 1.0 phm are suitable.

The initial monovinylaromatic charge is made with the randomizer present for the additional effect of causing the monovinylaromatic component resulting from each initiator charge to be of relatively narrow molecular weight distribution. Surprisingly, it has been found that superior results are obtained by having a polymodal molecular weight distribution of the total polymer chain lengths as a result of the addition of initiator at least three times and yet having the terminal monovinyl substituted aromatic component portions of the molecules resulting from each initiator addition be of relatively narrow molecular weight distribution.

The polymerization is carried out in a substantial absence of oxygen and water, preferably under an inert gas atmosphere. Prior to the coupling step, the reaction mass contains a very high percentage of molecules in which an alkali metal cation is positioned at one end of each polymer chain. Impurities in the feed such as water or alcohol reduce the amounts of monoalkali metal polymer in the reaction mass.

After virtually complete conversion of the last monomer added to the polymer, a suitable polyfunctional coupling agent is added. As used here, the term "coupling" means the bringing together and joining, by means of one or more central coupling atoms or coupling moieties, two or more of the living monoalkali metal-terminated polymer chains. A wide variety of compounds for such purposes can be employed.

Among the suitable coupling agents are the di- or multivinylaromatic compounds, di- or multiepoxides, di- or multiisocyanates, di- or multiimines, di- or multialdehydes, di- or multiketones, di- or multihalides, particularly silicon halides and halosilanes, mono-, di-, or multianhydrides, mono-, di-, or multiesters, preferably the esters of monoalcohols with polycarboxylic acids, diesters which are esters of monohydric alcohols with dicarboxylic acids, lactones, and the like, including combination type compounds containing two or more groups and mixtures.

Examples of suitable vinylaromatic coupling agents include, but are not limited to, divinylbenzene, 1,2,4-trivinylbenzene, 1,3-divinylnaphthalene, 1,3,5-trivinylnaphthalene, 2,4-divinylbiphenyl, diisopropenylbenzene and the like. Of these, the divinylaromatic hydrocarbons are preferred, particularly divinylbenzene in either its ortho, meta, or para isomer. Commercial divinylbenzene which is a mixture of the three isomers and other compounds is satisfactory.

Epoxidized hydrocarbon polymers such as epoxidized liquid polybutadiene and the epoxidized vegetable oils such as epoxidized soybean oil and epoxidized linseed oil, and epoxy compounds such as 1,2; 5,6; 9,10-triepoxydecane, and the like, can be used.

Examples of suitable multiisocyanates include benzene-1,2,4-triisocyanate, naphthalene-1,2,5,7-tetraisocyanate, and the like. Commercially available products known as PAPI-1, a polyarylpolyisocyanate having an average of 3 isocyanate groups per molecule and an average molecular weight of about 380 are suitable.

The multiimines, also known as multiaziridinyl compounds, such as those containing 3 or more aziridine rings per molecule, are useful. Examples include the triaziridinyl phosphine oxides or sulfides such as tri(1-aziridinyl)phosphine oxide, tri(2-methyl-1-aziridinyl)-phosphine oxide, tri(2-ethyl-3-decyl-1-aziridinyl)phosphine sulfide, and the like.

The multialdehydes are represented by compounds such as 1,4,7-naphthalenetricarboxyaldehyde, 1,7,9-anthracenetricarboxyaldehyde, 1,1,5-pentanetricarboxyaldehyde, and similar multialdehyde-containing aliphatic and aromatic compounds. The multiketones are represented by compounds such as 1,4,9,10-anthracenetetrone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

Among the multihalides are the silicon tetrahalides such as silicon tetrachloride, silicon tetrabromide, and silicon tetraiodide; the trihalosilanes such as trifluorosilane, trichlorosilane, trichloroethylsilane, tribromobenzylsilane, and the like; and the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogens as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2; 4,5-diepoxy-3-hexanone, 1,2; 11,12-diepoxy-8-pentadecanone, 1,3; 18,19-diepoxy-7,14-eicosanedione, and the like.

Other metal multihalides, particularly those of tin, lead, or germanium, can be employed as coupling and branching agents. Silicon or other metal multialkoxides, such as silicon tetraethoxide, are also suitable coupling agents.

The presently preferred coupling agent is epoxidized vegetable oil. Most preferred is epoxidized soybean oil.

Any effective amount of the coupling agent can be employed. While the amount is not believed to be particularly critical, a stoichiometric amount relative to the active polymer-alkali metal tends to promote maximum coupling as a generality. However, less than stoichiometric amounts can be used for lesser degrees of coupling where desired for particular products of broadened molecular weight.

Typically, the total amount of coupling agent is in the range of about 0.1 to 20 mhm (gram millimoles per 100 grams of total monomers employed in the polymerization, presently preferably about 0.1 to 1 mhm (or about 0.1 to 1 phm).

At the conclusion of the coupling process, the system is treated with an active hydrogen compound such as water, alcohol, phenols or linear saturated aliphatic mono- and dicarboxylic acids to remove the lithium from the polymer. Preferably, the polymer cement, i.e. the polymer in the polymerization solvent, is treated with terminating agents such as water and carbon dioxide and then antioxidants.

The resins are then stabilized with a combination of a hindered phenol and an organophosphite, specifically, octadecyl 3-(3',5'-di-t-butyl-4'-hydroxyphenyl) propionate and tris-nonylphenylphosphite. After stabilization, the hydrocarbon diluent is then flashed off the polymer solution to increase the solids content.

The polymers prepared according to this invention are polymodal, resinous block copolymers and contain from about 55 to 95, preferably 60 to 87, and more preferably 70 to 80, weight percent of polymerized monovinyl substituted aromatic hydrocarbon monomer based on the weight of total monomers employed.

In charges (1), (2a), (2b) and (2c) referred to in the Summary of the Invention above, the weight percentages of monovinylaromatic monomer as a percent of the total monovinylaromatic monomer charged are as shown in the following Table II.

TABLE II

| | Amounts of Monovinylaromatic Monomer in Each Charge | | |
|---|---|---|---|
| Charge[a] | Broad Range | Preferred Range | More Preferred Range |
| (1) | 15-60, wt. %[b] | 20-55, wt. %[b] | 24-50, wt. %[b] |
| (2a) | 5-35, wt. %[b] | 10-29, wt. %[b] | 15-23, wt. %[b] |
| (2b) | 4-25, wt. %[b] | 5-20, wt. %[b] | 7-18, wt. %[b] |
| (2c) | 6-40, wt. %[b] | 12-36, wt. %[b] | 15-31, wt. %[b] |

[a]These charges (1), (2a), (2b) and (2c) correspond to the like-numbered charges in the Summary of the Invention above.
[b]Based on total weight of styrene in the copolymer.

The weight ratio of monovinyl substituted aromatic monomer to conjugated diene monomer in charge (2b) is from about 5:1 to about 1:10, preferably from about 1:1 to about 1:2, and more preferably from about 1:0.7 to about 1:1.4.

The amount of inititiator in the first initiator charge is from about 0.005 mhm to about 10 mhm, preferably from about 0.1 mhm to about 1.0 mhm, and more preferably from about 0.03 mhm to about 0.04 mhm.

The amount of inititiator in the second initiator charge is from about 0.005 mhm to about 10 mhm, preferably from about 0.1 mhm to about 1.0 mhm, and more preferably from about 0.03 mhm to about 0.04 mhm.

The amount of inititiator in the third initiator charge is from about 0.01 mhm to about 50 mhm, preferably from about 0.05 mhm to about 10 mhm, and more preferably from about 0.07 mhm to about 1.0 mhm.

The following examples will describe in more detail the experimental process used and the polymodal tapered block copolymers with vinylarene terminal blocks obtained as a result of the process.

EXAMPLE I

In one run there was prepared a polymodal block copolymer of styrene, 1,3-butadiene monomers and a tapered styrene/butadiene copolymer. While not wishing to be bound by theory, applicants believe the copolymer prepared is comprised primarily of species having at least the following general formulas:

```
S—S—taper—S—B—x—B—S—taper—S—S
   S—taper—S—B—x—B—S—taper—S
           S—B—x—B—S
S—S—taper—S—B—x—B—S—taper—S
   S—S—taper—S—B—x—B—S
      S—taper—S—B—x—B—S
``` where
- S = polystyrene block polymer
- taper = random tapered block copolymer of butadiene and styrene
- B = polybutadiene block
- x = residual coupling agent This block copolymer was prepared in a six-step sequential charging process as follows. In a first step, cyclohexane, 1.63 phm; tetrahydrofuran, 0.5 phm; n-butyllithium, 0.035 phm; and styrene, 36 phm (where phm is parts per 100 parts total amount) were charged at 50° C. to a two-gallon reactor provided with a stirrer. The temperature peaked at about 95° C. while the styrene polymerized substantially adiabatically to completion in about 5 minutes. The pressure was about 30 psig.

Then a second charge of 0.035 phm n-butyllithium, 15.8 phm styrene and 13.2 phm cyclohexane was added to the stirred reactor at 69° C. The polymerization was allowed to proceed substantially adiabatically with polymerization temperature peaking at 80° C. Total reaction time was 5 minutes.

In a third step, 6.9 phm butadiene, 6.9 phm styrene and 13.2 phm cyclohexane were added to the stirred reactor and contents at 68° C. The polymerization was allowed to proceed substantially adiabatically peaking at 91° C. The total reaction time was 10 minutes.

In a fourth step, 0.08 phm n-butyllithium, 16.8 phm stryene and 13.2 phm cyclohexane were charged to the reactor and contents at 67° C. The reaction proceeded substantially adiabatically peaking at 88° C. Total polymerization time was 5 minutes.

In the fifth and final polymerization step, 17.7 phm butadiene and 6.6 phm cyclohexane were added to the reactor and contents at 84° C. The polymerization was allowed to proceed substantially adiabatically with temperature peaking at 105° C. Pressure was 60 psig. The total polymerization time was 10 minutes.

After polymerization was complete, in a sixth final coupling step, the contents of the reactor were heated to 93° C., and 0.4 phm epoxidized soybean oil was added. This was allowed to react for 15 minutes. A small amount of water and carbon dioxide was added in a post treatment. After 5 minutes a phenolic stablizer, 0.25 phm, and a phosphite stabilizer, 1.0 phm, were added. After another 5 minutes, the polymer solution, 33.2 weight percent concentration, was heated to 176° C. The cyclohexane was removed by flashing at ambient pressure. The isolated polymer, still containing some 15 to 20% residual cyclohexane, was dried further in a vacuum oven.

The polymerization product mixture just prior to the final coupling step has the following three species of monoalkali living polymers:

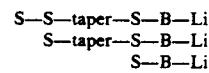

S—S—taper—S—B—Li
S—taper—S—B—Li
S—B—Li where
- S = polystyrene block
- taper = random tapered block copolymer of butadiene and styrene
- B = polybutadiene block
- Li = active lithium The final polymodal tapered block copolymer is a result of various combinations of each of these three species with itself and with each of the others.

Several additional resins were prepared in which the tapered block location and monomer were varied following essentially the same polymerization, coupling, and isolation procedure. The runs are shown in Table III. All of the polymerizations were done in a final solvent of approximately 201 phm. Polymerizations were usually initiated at or near 50° C. and allowed to proceed adiabatically. Polymerization time was 5 minutes for styrene and 10 minutes for butadiene and butadiene/styrene mixtures.

TABLE III

|  | Run 2 | Run 3 | Run 4 | Run 5 |
|---|---|---|---|---|
| Step 1 Charges | tetrahydrofuran, 0.5 phm | tetrahydrofuran, 0.5 phm | tetrahydrofuran, 0.5 phm | tetrahydrofuran, 0.5 phm |
|  | n-butyllithium, 0.035 phm | n-butyllithium, 0.030 phm | n-butyllithium, 0.030 phm | n-butyllithium, 0.0325 phm |
|  | styrene, 37 phn | styrene, 32 phm | styrene, 32 phm | styrene, 37 phm |
| Step 2 Charges | n-butyllithium, 0.035 phm | n-butyllithium, 0.035 phm | butadiene, 5 phm | n-butyllithium, 0.035 phm |
|  | styrene, 16 phm | styrene, 16 phm | styrene, 5 phm | styrene, 16 phm |
| Step 3 Charges | butadiene, 7 phm | butadiene, 7 phm | n-butyllithium, 0.035 phm | butadiene, 7 phm |
|  | styrene, 10 phm | styrene, 5 phm | styrene, 16 phm |  |
| Step 4 Charges | n-butyllithium, 0.080 phm | n-butyllithium, 0.080 phm | butadiene, 7 phm | n-butyllithium, 0.08 phm |
|  | styrene, 12 phm | styrene, 22 phm |  | styrene, 17 phm |
| Step 5 Charges | butadiene, 18 phm | butadiene, 18 phm | n-butyllithium, 0.08 phm | butadiene, 5 phm |
|  |  |  | styrene, 22 phm | styrene, 5 phm |
| Step 6 Charges |  |  | butadiene, 13 phm | butadiene, 13 phm |
| Products Going into Final Coupling | S—S—B/S—S—B—Li<br>S—B/S—S—B—Li<br>S—B—Li | S—S—B/S—S—B—Li<br>S—B/S—S—B—Li<br>S—B—Li | S—B/S—S—B—S—B—Li<br>S—B—S—B—Li<br>S—B—Li | S—S—B—S—B/S—B—Li<br>S—B—S—B/S—B—Li<br>S—B/S—B—Li |

TABLE III-continued

| | Run 2 | Run 3 | Run 4 | Run 5 |
|---|---|---|---|---|
| Step | | | | | where S = styrene polymer block
B = butadiene polymer block
B/S = tapered butadiene/styrene copolymer block
Note:
Run 1 is given as EXAMPLE I above.

A comparative run in which no tapered blocks were made is shown in Example II.

EXAMPLE II

| | Run 6 | |
|---|---|---|
| Step #1 | Tetrahydrofuran | 0.5 phm |
| | n-Butyllithium | 0.035 phm |
| | Styrene | 37 phm |
| Step #2 | n-Butyllithium | 0.035 phm |
| | Styrene | 16 phm |
| Step #3 | Butadiene | 7 phm |
| Step #4 | n-Butyllithium | 0.08 phm |
| | Styrene | 22 phm |
| Step #5 | Butadiene | 18 phm |

Intermediate products of this charging sequence resulted in the following polybutadienyllithium-terminated living molecules:

$$S-S-B-S-B-Li$$
$$S-B-S-B-Li$$
$$S-B-Li$$

Coupling of this polymer lithium with epoxidized soybean oil and isolation of the resulting polymodal polymer was done in a manner identical to that used for the inventive runs described above. While not wishing to be bound by theory, applicants believe that the resulting polymodal polymer primarily comprised six species from the six possible coupling combinations:

$$S-S-B-S-B-x-B-S-B-S-S$$
$$S-B-S-B-x-B-S-B-S$$
$$S-B-x-B-S$$
$$S-S-B-S-B-x-B-S-B-S$$
$$S-S-B-S-B-x-B-S$$
$$S-B-S-B-x-B-S$$

where
S = styrene block polymer
B = butadiene block polymer
x = residual coupling agent

EXAMPLE III

An invention run was done using the sequence of charges represented by charges (1), (2b), (2a), (2c) and (3) as listed in the Summary of the Invention above with an additional butadiene charge made next succeeding charge 2a. This invention run (designated Run 7 in the Tables) was carried out in the manner generally described in Example I for Runs 1 through 5. Invention Run 7 differed in that the following steps and amounts were used.

| | Run 7 | |
|---|---|---|
| Step #1 | Tetrahydrofuran | 0.5 phm |
| | n-Butyllithium | 0.03 phm |
| | Styrene | 32 phm |
| Step #2 | Butadiene | 5 phm |
| | Styrene | 5 phm |
| Step #3 | n-Butyllithium | 0.035 phm |

-continued

| | Run 7 | |
|---|---|---|
| | Styrene | 16 phm |
| Step #4 | Butadiene | 7 phm |
| Step #5 | n-Butyllithium | 0.08 phm |
| | Styrene | 22 phm |
| Step #6 | Butadiene | 13 phm |
| Step #7 | Epoxidized Vegetable Oil | 0.4 phm |

Intermediate products of the charging sequence of Run 7 are believed to have resulted in the following polybutadienyllithium-terminated living molecules:

$$S-B/S-S-B-S-B-Li$$
$$S-B-S-B-Li$$
$$S-B-Li$$

Coupling of this polymer lithium with epoxidized soybean oil and isolation of the resulting polymodal polymer was done in a manner identical to that used for the inventive runs described above. While not wishing to be bound by theory, applicants believe that the resulting polymodal polymer primarily comprised six species from the six possible coupling combinations:

$$S-B/S-S-B-S-B-x-B-S-B-S-S/B-S$$
$$S-B-S-B-x-B-S-B-S$$
$$S-B-x-B-S$$
$$S-B/S-S-B-S-B-x-B-S-B-S$$
$$S-B/S-S-B-S-B-x-B-S$$

where
S = styrene block polymer
B = butadiene block polymer
x = residual coupling agent

EXAMPLE IV

A comparative run (Run 8) was done using the same procedure and experimental conditions under which inventive Run 7 was made with the exception that no coupling step was done. The following steps and amounts were used.

| | Run 8 | |
|---|---|---|
| Step #1 | Tetrahydrofuran | 0.5 phm |
| | n-Butyllithium | 0.029 phm |
| | Styrene | 32 phm |
| Step #2 | Butadiene | 5 phm |
| | Styrene | 5 phm |
| Step #3 | n-Butyllithium | 0.03 phm |
| | Styrene | 16 phm |
| Step #4 | Butadiene | 7 phm |
| Step #5 | n-Butyllithium | 0.08 phm |
| | Styrene | 22 phm |
| Step #6 | Butadiene | 13 phm |

After termination of the polymerization and product recovery, it is believed that the following species are present in the polymodal block copolymer made in Run 8;

S—B/S—S—B—S—B
S—B—S—B
S—B

EXAMPLE V

A comparative run (Run 9) was done using the same procedures and experimental conditions under which inventive Run 7 was made with the exception that the charge which would produce a tapered block was made just prior to the coupling step.

| Run 9 | | |
|---|---|---|
| Step #1 | Tetrahydrofuran | 0.5 phm |
| | n-Butyllithium | 0.029 phm |
| | Styrene | 32 phm |
| Step #2 | n-Butyllithium | 0.03 phm |
| | Styrene | 21 phm |
| Step #3 | Butadiene | 20 phm |
| Step #4 | n-Butyllithium | 0.08 phm |
| | Styrene | 17 phm |
| Step #5 | Butadiene | 5 phm |
| | Styrene | 5 phm |
| Step #6 | Epoxidized Vegetable Oil | 0.4 phm |

Intermediate products of the charging sequence used for Run 9 resulted in the following polystyryllithium-terminated living molecules:

S—S—B—S—B/S—Li
S—B—S—B/S—Li
S—B/S—Li

Coupling of this polymer lithium with epoxidized soybean oil and isolation of the resulting polymodal polymer was done in a manner identical to that used for the inventive runs described above. While not wishing to be bound by theory, applicants believe that the resulting polymodal polymer primarily comprised six species from the six possible coupling combinations:

S—S—B—S—B/S—x—S/B—S—B—S—S
S—B—S—B/S—x—S/B—S—B—S
S—B/S—x—S/B—S
S—S—B—S—B/S—x—S/B—S—B—S
S—S—B—S—B/S—x—S/B—S
S—B—S—B/S—x—S/B—S where
S=styrene block polymer
B=butadiene block polymer
B/S=tapered block polymer
x=residual coupling agent

EXAMPLE VI

A comparative run (Run 10) was done using the same procedures and experimental conditions under which inventive Run 7 was made with the exception that no step which would produce a tapered block was made. Run 10 is dintinguishable from Run 6 in that the following steps and amounts were used.

| Run 10 | | |
|---|---|---|
| Step #1 | Tetrahydrofuran | 0.5 phm |
| | n-Butyllithium | 0.029 phm |
| | Styrene | 32 phm |
| Step #2 | n-Butyllithium | 0.03 phm |
| | Styrene | 21 phm |
| Step #3 | Butadiene | 5 phm |

| -continued | | |
|---|---|---|
| Run 10 | | |
| Step #4 | n-Butyllithium | 0.08 phm |
| | Styrene | 22 phm |
| Step #5 | Butadiene | 20 phm |
| Step #6 | Epoxidized Vegetable Oil | 0.4 phm |

Intermediate products of this charging sequence resulted in the following polybutadienyllithium-terminated living molecules:

S—S—B—S—B—Li
S—B—S—B—Li
S—B—Li

Coupling of this polymer lithium with epoxidized soybean oil and isolation of the resulting polymodal polymer was done in a manner identical to that used for the inventive runs described above. While not wishing to be bound by theory, applicants believe that the resulting polymodal polymer primarily comprised six species from the six possible coupling combinations:

S—S—B—S—B—x—B—S—B—S—S
S—B—S—B—x—B—S—B—S
S—B—x—B—S
S—S—B—S—B—x—B—S—B—S
S—S—B—S—B—x—B—S
S—B—S—B—x—B—S where
S=styrene block polymer
B=butadiene block polymer
x=residual coupling agent

SHRINK TEST PROCEDURE

The rsins to be tested for shrink were extruded as 20 mil sheets using a 1.25" extruder with a 6" wide die and a 0.020" die gap.

Samples were die cut from the 20 mil extruded sheets and conditioned at 205°–210° F. The samples were stretched by an A.M. Long film stretcher at 205°–210° F. at a rate of 1000%/min. The amount of stretch was 2X in the machine direction (MD) and 3X in the transverse direction (TD).

A standard test method, ASTM-D2732-70, was used to measure unrestrained linear thermal shrinkage. The specimens were die cut to 2.5"×2.5" by the normal thickness. Three specimens of each were tested. The test specimens were conditioned at 23°±2° C. and 50±5 percent relative humidity for not less than 40 hours prior to testing. The specimens were placed in a free shrink holder. The holder did not restrain the specimens from floating in the bath medium, glycerine. The bath temperature was maintained for 10 minutes. The specimens were then removed from the bath and quickly immersed in water at room temperature. The specimens were set aside to cool for one hour, and then both the machine and transverse linear directions were measured.

The percent of free shrinkage for each direction was calculated as follows:

$$\text{Shrinkage \%} = \frac{L_1 - L_2}{L_1} \times 100$$

where $L_1$ = initial length of side
$L_2$ = length of side after shrinkage
The results of the shrink tests of the polymers made in Runs 1-6 given in Table IV.

TABLE IV

| | Percent Shrink. Machine Direction/Transverse Direction | | | | | |
|---|---|---|---|---|---|---|
| | Run 1 | Run 2 | Run 3 | Run 4 | Run 5 | Run 6 |
| Butadiene/Styrene Monomer weight ratio in blend charge | 1:1 | 1:1.4 | 1:0.7 | 1:1 | 1:1 | — |
| Tested at 60° C. | 0.4/3.0 | 0.8/1.6 | 0.4/2.2 | 0.4/1.2 | 1.4/3.0 | -0-/0.8 |
| Tested at 70° C. | 3.4/8.4 | 1.4/4.0 | 3.8/8.8 | 4.0/12.0 | 3.2/10.2 | 0.8/3.8 |
| Tested at 80° C. | 15.6/26.7 | 11.0/19.2 | 11.6/23.6 | 15.8/27.8 | 11.0/23.2 | 4.2/17.6 |

Notes:
The material tested in each of the runs, 1 through 6, in this table is the polymodal polymeric material produced in each of the correspondingly numbered runs described above in Example I, Table III and Example II. Runs 1 through 5 are tests of inventive polymers within the scope of this invention and Run 6 is a test of the control run material from Example II.

It can be seen from the shrink test results shown in Table IV that all the resins of the invention had greater shrink than the control resin. Shrink was greater in the transverse, cross direction of the extruded sheet. Although all the resins with tapered blocks had better shrink than the control resin, location of the tapered block and monomer ratio affected shrink. It can be noted from the above table that, in general, the greater the amount of butadiene relative to the amount of styrene in the polymodal tapered block copolymer, the better the shrink obtained. The butadiene to styrene monomer weight ratio was the same in the copolymers of Runs 4 and 5, but because of the tapered block being located nearer the terminal polystyrene block, Run 4 exhibited better shrink than Run 5.

Another set of runs was done in order to show distinctions between the invention polymers and polymers having some of the features not characteristic of the invention polymers.

Tests of Runs 7, 8, 9 and 10 were done in the same manner as that described in the test procedures and with the same equipment used to evaluate Runs 1, 2, 3, 4, 5 and 6, except that the resins to be tested were extruded as 15 mil sheets.

TABLE V

| | | | Percent Shrink, Machine Direction | | Percent Shrink, Transverse Direction | | Environmental Stress Crack Resistance | |
|---|---|---|---|---|---|---|---|---|
| Polymer | Comparison Feature | Melt Flow[a] | at 158° F. | at 176° F. | at 158° F. | at 176° F. | Curl Up | Curl Down |
| Run 7 | inventive run | 5.5 | 8 | 40 | 0 | 19 | .14 | .10 |
| Run 8 | no coupling | 42 | 11 | 28 | 2 | 9 | .22 | .24 |
| Run 9 | tapered block on end prior to coupling | 1.8 | 17 | 39 | 5 | 15 | 1.2 | 1.5 |
| Run 10 | no taper | 8.6 | 5 | 19 | 2 | 11 | .86 | 1.5 |

[a]g/10 min.

It can be seen from the shrink tests results shown in Table V that all of the non-inventive runs exhibited less shrink than any of the inventive Runs 1-5 and 7.

EXAMPLE VII

Three invention runs (designated Runs A, B and C) were made using the procedures described in Example I, but with the sequence of steps and amounts of charges shown in Table VI. These three runs were tested for environmental stress crack resistance potential by use of an accelerated test referred to as the Puncture Test. Test specimens about 2 inces square were cut from an interior layer about 0.015 inches thick from a coil or roll of extruded sheet. The side of the film or sheet facing away or furtherest from the center of the coil or roll, of course, must "stretch" or cover more distance than the side closest to the center of the coil or roll. Results obtained from the outside part of a rolled layer are termed "curl down" and those from the inside part are termed "curl up".

Each specimen was clamped over a hole about 1 inch in diameter and 4 drops of soybean oil were placed on the specimen over the hole. A rounded tipped stainless steel rod about ½ inch in diameter was weighted with a 2 kg load and brought into contact with the specimen. The time to failure in minutes was recorded. Ten specimens of each run were tested and the results were averaged.

TABLE VI

| | Amounts of Styrene and Butadiene and Resultant Properties | | | |
|---|---|---|---|---|
| | Invention Run A | Invention Run B | Invention Run C | Comparison Material[a] |
| Step 1 | | | | |
| Styrene | 30 phm | 30 phm | 24 phm | |
| Step 2 | | | | |
| Styrene | 16 phm | 16 phm | 16 phm | |
| Step 3 | | | | |
| Butadiene | 6 phm | 18 phm | 12 phm | |
| Styrene | 6 phm | 18 phm | 12 phm | |
| Step 4 | | | | |
| Styrene | 18 phm | 6 phm | 18 phm | |
| Step 5 | | | | |
| Butadiene | 24 phm | 12 phm | 18 phm | |
| Melt flow, g/10 min. | 8.7 | 6.4 | 6.3 | |
| Environmental Stress Crack Resistance | | | | |
| Curl up | 114.7 | 156.1 | 205.9 | 5.2 |
| Curl down | 128.0 | 161.6 | 155.7 | 8.0 |

[a]For purposes of comparison KR05 K-Resin ® polymer commercially available from Phillips Petroleum Company was tested.

That which is claimed is:

1. A method of preparing a polymer comprising:
   (1) charging a monovinylaromatic monomer and an initiator and in the presence of a randomizer and allowing polymerization to occur until essentially no free monomer is present; thereafter
   (2a) charging additional monovinylaromatic monomer and initiator, and allowing polymerization to occur until essentially no free monomer is present;
   (2b) charging a mixture of monovinylaromatic monomer and conjugated diene monomer, and allowing polymerization to occur until essentially no free monomer is present;
   (2c) charging additional monovinylaromatic monomer and additional initiator, and allowing polymerization to occur until essentially no free monomer is present; thereafter
   (3) charging conjugated diene monomer and allowing polymerization to occur until essentially no free monomer is present; and finally
   (4) charging the reaction mixture with a coupling agent.

2. A method according to claim 1 wherein Step (2b) is carried out after Step (2a) and Step (2c) is carried out after Step (2b).

3. A method according to claim 1 wherein said monovinylaromatic monomer contains 8 to 12 carbon atoms and said conjugated diene contains 4 to 6 carbon atoms, said monomers being introduced at a ratio of about 60 to 87 weight percent monovinylaromatic monomer and 13 to 40 weight percent conjugated diene monomer, thus giving a resinous tapered block copolymer.

4. A method according to claim 1 comprising in addition charging additional conjugated diene after polymerization of charge 1 is complete and before the last charge prior to introducing the charge (3) conjugated diene.

5. A method according to claim 1 in which the initiator additions of (1), (2a) and (2c) represent the only initiator introductions during the course of the process.

6. A method according to claim 1 wherein the weight ratio of the amount of said monovinylaromatic monomer and said conjugated diene monomer in step (2b) is about 1 to 1.

7. A method according to claim 1 wherein the weight ratio of said monovinylaromatic monomer and said conjugated diene monomer in step (2b) is within the range of about 1:0.7 to 1:1.4.

8. A method according to claim 1 wherein said monovinylaromatic monomer charged in Step (1) is from about 15 to about 60 weight percent of the total weight percent of monovinylaromatic monomer charged in said method.

9. A method according to claim 1 wherein said monovinylaromatic monomer charged in Step (1) is from about 20 to about 55 weight percent of the total weight percent of monovinylaromatic monomer charged in said method.

10. A method according to claim 1 wherein said monovinylaromatic monomer charged in Step (1) is from about 24 to about 50 weight percent of the total weight percent of monovinylaromatic monomer charged in said method.

11. A method according to claim 1 wherein said monovinylaromatic monomer charged in Step (2a) is from about 5 to about 35 weight percent of the total weight percent of monovinylaromatic monomer charged in said method.

12. A method according to claim 1 wherein said monovinylaromatic monomer charged in Step (2a) is from about 10 to about 29 weight percent of the total weight percent of monovinylaromatic monomer charged in said method.

13. A method according to claim 1 wherein said monovinylaromatic monomer charged in Step (2a) is from about 15 to about 23 weight percent of the total weight percent of monovinylaromatic monomer charged in said method.

14. A method according to claim 1 wherein said monovinylaromatic monomer charged in Step (2b) is from about 4 to about 25 weight percent of the total weight percent of monovinylaromatic monomer charged in said method.

15. A method according to claim 1 wherein said monovinylaromatic monomer charged in Step (2b) is from about 5 to about 20 weight percent of the total weight percent of monovinylaromatic monomer charged in said method.

16. A method according to claim 1 wherein said monovinylaromatic monomer charged in Step (2b) is from about 7 to about 18 weight percent of the total weight percent of monovinylaromatic monomer charged in said method.

17. A method according to claim 1 wherein said monovinylaromatic monomer charged in Step (2c) is from about 6 to about 40 weight percent of the total weight percent of monovinylaromatic monomer charged in said method.

18. A method accoding to claim 1 wherein said monovinylaromatic monomer charged in Step (2c) is from about 12 to about 36 weight percent of the total weight percent of monovinylaromatic monomer charged in said method.

19. A method according to claim 1 wherein said monovinylaromatic monomer charged in Step (2c) is from about 15 to about 31 weight percent of the total weight percent of monovinylaromatic monomer charged in said method.

20. A method according to claim 1 wherein said conjugated diene monomer is 1,3-butadiene, said monovinylaromatic monomer is styrene, said organomonoalkali metal initiator is n-butyllithium, and said randomizer is tetrahydrofuran.

21. A method according to claim 20 wherein said coupling agent is epoxidized soybean oil;
   wherein the polymerization is carried out in a hydrocarbon diluent;
   wherein additional butadiene is added after polymerization of the charge in Step (1) is essentially complete and before the last charge prior to introducing Step (3) butadiene charge;
   wherein the polymerization is carried out in a substantial absence of oxygen and water at temperatures ranging from −10° C. to 150° C.;
   wherein, after said coupling agent reacts with products of said polymerization steps, the system is treated with terminating agents and then antioxidants;

wherein said terminating agents are water and carbon dioxide;

wherein stabilizers chosen from the group of hindered phenols and organophosphites are added to the reactants; and wherein, after termination with said water and carbon dioxide, any remaining hydrocarbon diluent is flashed off.

22. Polymodal copolymers produced in accordance with the method of claim 1.

* * * * *